US007705265B2

(12) United States Patent
Asakura et al.

(10) Patent No.: US 7,705,265 B2
(45) Date of Patent: Apr. 27, 2010

(54) METHOD OF CONNECTING AND STRUCTURE OF CONNECTING ELECTRIC WIRE AND CONNECTION TERMINAL

(75) Inventors: Nobuyuki Asakura, Shizuoka (JP); Kei Fujimoto, Shizuoka (JP); Masanori Onuma, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 571 days.

(21) Appl. No.: 11/265,360

(22) Filed: Nov. 3, 2005

(65) Prior Publication Data

US 2006/0057903 A1 Mar. 16, 2006

Related U.S. Application Data

(62) Division of application No. 10/732,269, filed on Dec. 11, 2003.

(51) Int. Cl.
*H01R 4/02* (2006.01)
*B23K 26/42* (2006.01)

(52) U.S. Cl. ...................... 219/121.64; 29/860; 29/863; 228/136; 439/874; 439/877

(58) Field of Classification Search ............ 219/121.63, 219/121.64, 121.85; 29/860, 863; 228/136; 439/874, 877, 882

See application file for complete search history.

(56) References Cited

U.S. PATENT DOCUMENTS 3,566,008 A 2/1971 Ettlinger et al.
3,656,092 A 4/1972 Swengel et al.
3,838,387 A 9/1974 Grillet
3,990,143 A * 11/1976 Dittmann et al. .............. 29/865
4,034,152 A 7/1977 Warner
4,117,300 A 9/1978 Ricards
4,224,499 A * 9/1980 Jones .................... 219/121.85
4,519,666 A 5/1985 Williams et al.
4,574,176 A * 3/1986 Sharp .................... 219/121.64
4,626,653 A 12/1986 Sciaky et al.
4,636,606 A * 1/1987 Chastanet et al. ...... 219/121.63
4,690,480 A 9/1987 Snow et al.
4,690,647 A 9/1987 Hamsher et al.

(Continued)

FOREIGN PATENT DOCUMENTS

DE 19902405 A1 8/2000

(Continued)

OTHER PUBLICATIONS

"Welding Skills and Practices", Giachino et al, American Technical Society, pp. 26 and 396, Copyright 1974.*

(Continued)

*Primary Examiner*—Samuel M Heinrich
(74) *Attorney, Agent, or Firm*—Sughrue Mion, PLLC

(57) ABSTRACT

After bringing a conductor of an electric wire into press contact to connect with a wire caulking portion of a connection terminal, the conductor and the wire caulking portion are welded to connect by irradiating laser beam to a bottom wall of the wire caulking portion. Laser irradiation is carried out intermittently by three times and the laser irradiation at the second time and thereafter which is carried out later is carried out such that during a time period in which a laser welded portion immediately previously is brought into a predetermined state of elevating temperature, portions or welded regions overlap welded regions in laser irradiation irradiated previously.

2 Claims, 5 Drawing Sheets

U.S. PATENT DOCUMENTS

| | | | | | |
|---|---|---|---|---|---|
| 4,692,121 | A | | 9/1987 | Arbogast, Jr. | |
| 4,751,777 | A | | 6/1988 | Savel, III | |
| 4,913,678 | A | * | 4/1990 | Avellino et al. | 439/879 |
| 4,966,565 | A | | 10/1990 | Dohi | |
| 4,995,838 | A | | 2/1991 | Ayer et al. | |
| 5,137,013 | A | * | 8/1992 | Chiba et al. | 606/205 |
| 5,272,807 | A | | 12/1993 | Henschen et al. | |
| 5,330,523 | A | * | 7/1994 | Campbell et al. | 607/129 |
| 5,409,479 | A | * | 4/1995 | Dew et al. | 606/9 |
| 5,418,331 | A | | 5/1995 | Delalle | |
| 5,499,439 | A | * | 3/1996 | Zaborszki et al. | 29/508 |
| 5,500,503 | A | | 3/1996 | Pernicka et al. | |
| 5,749,656 | A | * | 5/1998 | Boehm et al. | 374/185 |
| 5,762,526 | A | | 6/1998 | Kuramoto et al. | |
| 5,808,260 | A | * | 9/1998 | Asakura et al. | 219/56.22 |
| 5,877,472 | A | | 3/1999 | Campbell et al. | |
| 6,045,944 | A | | 4/2000 | Okada et al. | |
| 6,271,499 | B1 | * | 8/2001 | Jones et al. | 219/121.64 |
| 6,293,594 | B1 | | 9/2001 | Safarevich et al. | |
| 6,373,024 | B1 | | 4/2002 | Safarevich et al. | |
| 6,538,203 | B1 | | 3/2003 | Noelle et al. | |
| 6,579,626 | B1 | | 6/2003 | Ottinger et al. | |
| 6,651,437 | B2 | | 11/2003 | Farmer et al. | |
| 6,709,258 | B2 | | 3/2004 | Paulson et al. | |
| 2002/0028612 | A1 | | 3/2002 | Ushijima et al. | |
| 2003/0027444 | A1 | | 2/2003 | Engeser | |
| 2004/0004059 | A1 | | 1/2004 | Oishi | |
| 2004/0133259 | A1 | | 7/2004 | Janke et al. | |
| 2005/0230371 | A1 | * | 10/2005 | Kutsuna et al. | 219/121.85 |

FOREIGN PATENT DOCUMENTS

| | | | | |
|---|---|---|---|---|
| JP | S49-122852 | U | | 11/1974 |
| JP | 358086994 | A | * | 5/1983 |
| JP | 2-103876 | A | | 4/1990 |
| JP | 04-137380 | | | 5/1992 |
| JP | 404143085 | A | * | 5/1992 |
| JP | 406104019 | A | * | 4/1994 |
| JP | 06155058 | A | * | 6/1994 |
| JP | 6-302341 | A | | 10/1994 |
| JP | 07-085901 | | | 3/1995 |
| JP | 409099382 | A | * | 4/1997 |
| JP | 11-297371 | A | | 10/1999 |
| JP | 2000-231944 | A | | 8/2000 |
| JP | 2000231944 | | | 8/2000 |
| JP | 2002050448 | | | 2/2002 |
| JP | 2002-158044 | A | | 5/2002 |

OTHER PUBLICATIONS

Metals Handbook Ninth Edition, vol. 6, Welding, Brazing, and Soldering, "Laser Beam Welding", p. 649, copyright 1983.*

* cited by examiner

METHOD OF CONNECTING AND STRUCTURE OF CONNECTING ELECTRIC WIRE AND CONNECTION TERMINAL

This application is a divisional of application Ser. No. 10/732,269 filed Dec. 11, 2003.

The present application is based on Japanese Patent Application No. 2002-359486, the entire contents of which are incorporated herein by reference.

BACKGROUND OF THE INVENTION

1. Field of the Invention

The present invention relates to a method of connecting and a structure of connecting an electric wire and a connection terminal for bringing a conductor of an electric wire into press contact to connect with a wire caulking portion of a connection terminal and thereafter welding to connect the conductor and the connection terminal by laser welding.

2. Related Art

Conventionally, as a method of connecting an electric wire and a connection terminal, there is spread a method of electrically connecting an electric wire and a connection terminal by bringing a wire caulking portion mounted to the connection terminal into press contact to connect to caulk on a conductor of the electric wire.

However, in the case of a press contact connection, when the conductor of the electric wire is constituted by a multicore twisted wires structure, although core wires disposed on an outer peripheral side thereof are brought into direct contact with the connection terminal and therefore, conduction is easy to achieve, core wires disposed on a center side thereof is brought into contact with the connection terminal via the core wires on the outer peripheral side.

Further, when dimensions of C/W and C/H of a press contact terminal 1 do not match as shown by FIG. 5, a clearance 5 is liable to be produced between a conductor press contact portion 1*a* and a conductor 3, which is devoid of reliability of electric connection. Therefore, there poses a problem that many kinds of press contact terminals having dimensions of C/W and C/H matched to respective sizes of electric wires and respective kinds of terminals need to prepare and caulking operation needs to control to thereby increase fabrication cost.

Hence, in order to prevent contact resistance at a press contact portion from being dispersed, as shown by FIG. 6, there has been proposed a connecting method of bringing the conductor 3 of an electric wire 2 into press contact to connect with the conductor press contact portion 1*a* of the connection terminal 1 and thereafter irradiating laser beam 9 from a laser generating apparatus 8 to the conductor 3 exposed at the center portion and the front and rear portions of an upper face of the conductor press contact portion 1*a* to thereby weld the conductor press contact portion 1*a* and the conductor 3 (for example, refer to JP-A-2-103876).

However, according to the above-described connecting method, as shown by FIG. 7, there poses a problem that a terminal material melted by irradiating the laser beam 9 is absorbed by clearances of the conductor 3 and a large recess 13 is produced at a laser welded portion 11 to thereby reduce welding strength or the like. Further, in laser welding, the welding is carried out by irradiating the laser beam having high density energy and therefore, rapid heating or rapid boiling of the terminal material and the conductor is brought about which may bring about explosive scattering (splash phenomenon).

Hence, there has been proposed a laser welding terminal in which a wire caulking portion of a connection terminal is provided with a projected portion or a thick-walled portion for replenishing a melted volume and a recess produced by irradiating laser beam is filled by the melted projected portion or the melted thick-walled portion (for example, refer to JP-A-6-302341).

Further, as shown by FIG. 8, there has been proposed a structure of a connecting portion in which there is formed an irradiation port 17 for irradiating laser beam at a pair of core line press contact pieces 16, 16 formed at a press contact portion 15 of a connection terminal 14 and respective strands of the core line portion 3 are subjected to laser welding by irradiating laser directly to the core line portion 3 at inside of the press contact portion 15 by passing the irradiation port 17 (for example, refer to JP-A-2000-231944).

According thereto, even when the connection terminal is brought into press contact therewith without previously operating excessive press contact force to a portion of core lines which are not welded, respective strands can be welded together at inside of the press contact portion, and electric resistance between the connection terminal and the electric wire can be restrained to reduce by restraining to reduce contact resistance among the respective strands.

However, when the electric wire and the connection terminal are connected by laser welding described in JP-A-6-302341 and JP-A-2000-231944, mentioned above, and the like, as described above, the projected portion or the thick-walled portion for replenishing the welded volume needs to provide at the wire caulking portion of the connection terminal, or the irradiation port for irradiating laser beam needs to form at inside of the press contact portion of the connection terminal to thereby pose a problem of increasing working steps in fabricating the connection terminal or increasing cost of the connection terminal owing to complicated formation of a die for pressing a connection terminal.

Further, in recent times, there are a number of cases in which materials (physical properties) of a connection terminal and an electric wire differ from each other. For example, although Cu alloys are frequently used for the material of the connection terminal, in contrast thereto, a material which is difficult to achieve electric conduction of aluminum series or Fe—Ni series or the like is frequently used for the material of the electric wire. Whereas a melting point and heat of melting of aluminum are 660° C. and 94.5 cal/g, and a melting point and heat of melting of copper are 1083° C. and 50.6 cal/g and physical properties thereof differ from each other significantly and therefore, it is difficult to ensure excellent connection function by applying laser welding, mentioned above.

SUMMARY OF THE INVENTION

An object of the invention relates to resolving the above-described problem and provides an excellent method of connecting and an excellent structure of connecting an electric wire and a connection terminal capable of stably ensuring an electric resistance and a mechanical strength of the connection terminal and the electric wire without increasing cost of the connection terminal.

The above-described object of the invention is achieved by a method of connecting an electric wire and a connection terminal characterized in that a conductor of an electric wire is brought into press contact to connect with a wire caulking portion of a connection terminal, thereafter, laser irradiation for welding to connect the conductor and the wire caulking portion by irradiating a laser beam to the wire caulking portion is carried out at least two times or more and the laser irradiation which is carried out later is carried out such that within a time period in which a laser welded portion welded previously is brought into a predetermined state of elevating a temperature, a portion of a welded region thereof overlaps the welded region in laser irradiation welded previously as described.

Further, the above-described object of the invention is achieved by a structure of connecting an electric wire and a connection terminal characterized in that a conductor of an electric wire brought into press contact to connect with a wire caulking portion of a connection terminal is welded to the wire caulking portion by a laser at two portions or more thereof and portions of welded regions at respective times of welding by the laser overlap each other.

According to the method of connecting and the structure of connecting the electric wire and the connection terminal having the above-described constitution, the connection terminal and the electric wire are welded to connect by irradiating the laser beam from above the wire caulking portion of the connection terminal, a metallic bonding portion is formed between the connection terminal and the electric wire and therefore, the electric resistance and the mechanical strength can stably be ensured.

Further, at a laser beam irradiated portion at the first time, rapid boiling is brought about by rapid heating by irradiating the laser beam and explosive scattering can be brought about at the wire caulking portion.

However, laser beam irradiated portions at the second time and thereafter are set such that a welded region thereof overlaps a welded portion of the laser beam irradiated portion immediately previously, laser irradiation is carried out within a time period in which a state of elevating a temperature by irradiating the laser beam immediately previously remains and therefore, rapid heating is not constituted by heating by irradiating laser beam at the second time and thereafter, the material is gradually melted and therefore, explosive scattering caused by rapid boiling can be prevented from being brought about.

Further, even when a recess or a cavity is formed by explosive scattering in the irradiating laser beam at the first time, a material which is melted gradually flows into the recess or the cavity to fill in irradiating the laser beam at the second time and therefore, the recess or the cavity does not remain in the laser welded portion.

Hence, even when materials (physical properties) of the connection terminal and the electric wire differ from each other and laser beam having a high density energy matched to a material having large heat of melting needs to be irradiated, a stable welded state can be achieved by preventing explosive scattering from being brought about and an excellent connected state between the connection terminal and the electric wire conductor can be maintained over a long period of time.

DETAILED DESCRIPTION OF THE PREFERRED EMBODIMENTS

A detailed explanation will be given of a method of connecting and a structure of connecting an electric wire and a connection terminal according to an embodiment of the invention in reference to the attached drawings as follows.

Figure 1:
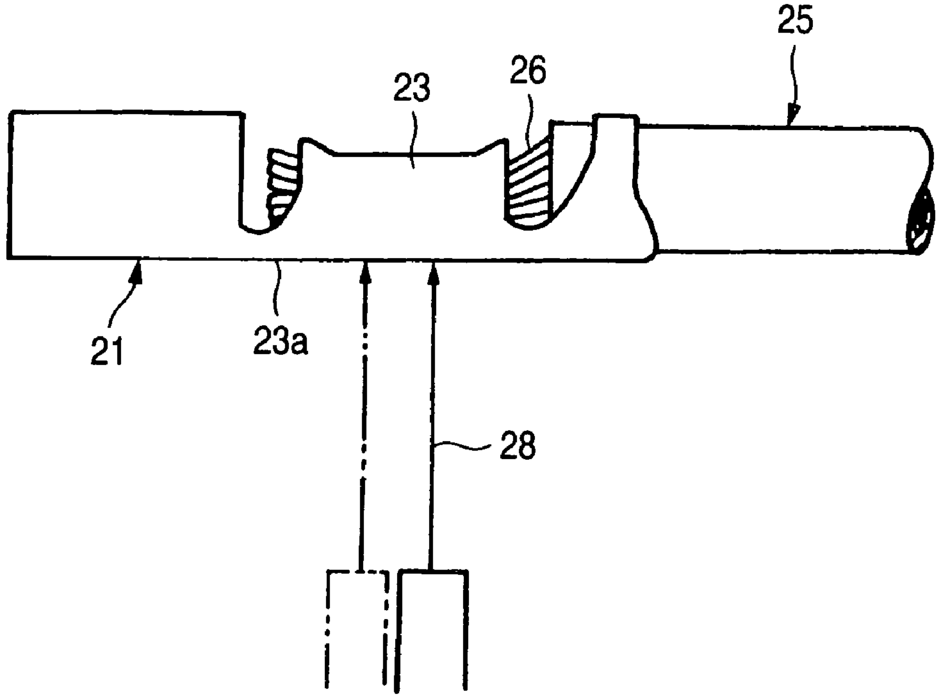
FIG. 1 is a side view for explaining a method of connecting and electric wire and a connection terminal according to an embodiment of the invention.
Figure 2:
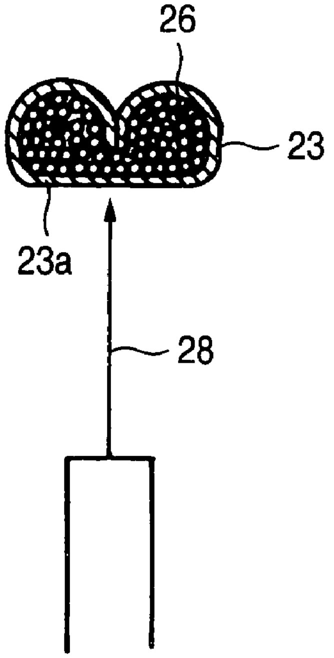
FIG. 2 is a cross-sectional view of an essential portion of FIG. 1.

As shown by FIG. 1 and FIG. 2, according to a method of connecting an electric wire 25 and a connection terminal 21, after bringing a conductor 26 of the electric wire 25 into press contact to connect with a wire caulking portion 23 of the connection terminal 21, the conductor 26 and the wire caulking portion 23 are welded to connect by irradiating laser beam 28 to a bottom wall 23*a* of the wire caulking portion 23.

In this case, the laser irradiation is carried out intermittently by three times and laser irradiation at the second time and thereafter which is carried out later is carried out such that within a time period (within a short time period of about 2 seconds) in which a laser welded portion immediately previously is brought into a predetermined elevated temperature state such that a portion of a welded region at the second time and thereafter overlaps a welded region in laser irradiation immediately previously.

According to the embodiment, the laser welded portion is set to the bottom wall 23*a* of the wire caulking portion 23 which is not deformed in press contact connection and the laser beam 28 is irradiated from an outer side of the bottom wall 23*a*.

As shown by FIG. 2, respective laser irradiated portions are disposed substantially on a center line in a width direction of the bottom wall 23*a* and a welding at the first time, welding at the second time and welding at the third time are carried out by shifting positions thereof successively along a longitudinal direction of the electric wire 25.

Figure 3A:
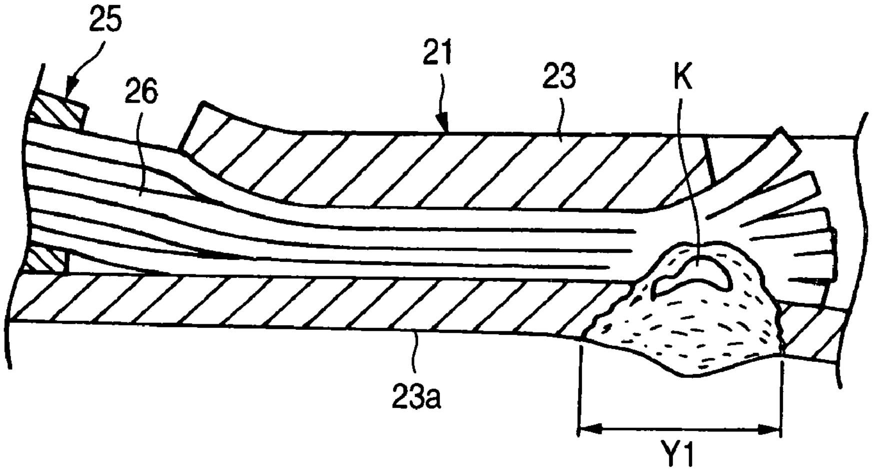
FIGS. 3A to 3C illustrate sectional views enlarging an essential portion showing a state of welding the electric wire and the connection terminal according to the embodiment.
Figure 3B:
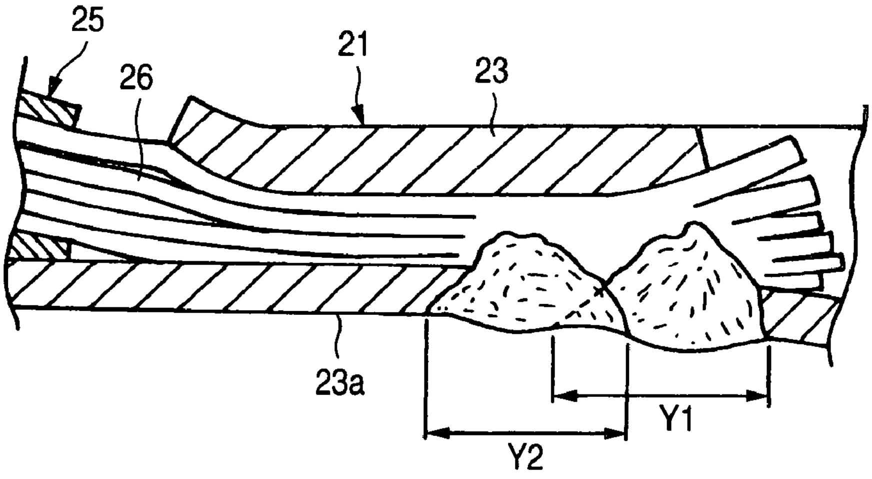
Figure 3C:
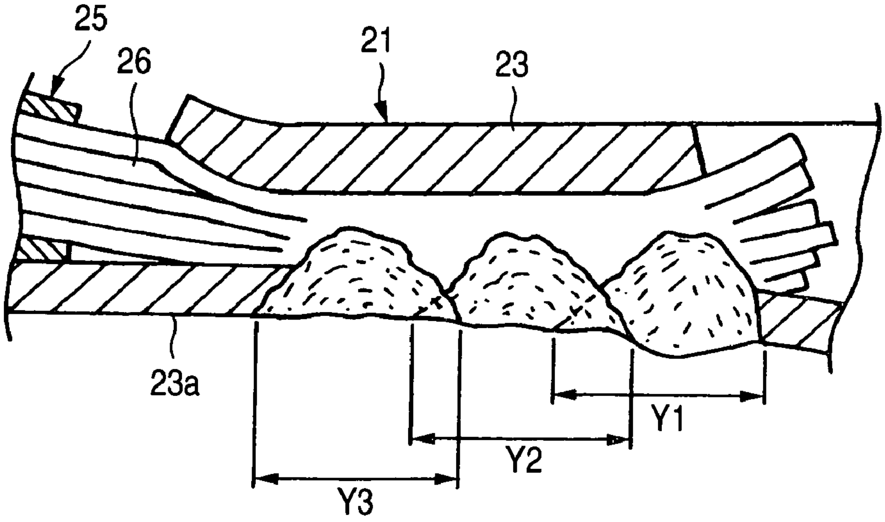

FIGS. 3A to 3C illustrate sectional views enlarging an essential portion showing a state of welding the electric wire 25 and the connection terminal 21 according to the embodiment, FIG. 3A shows a welded region Y1 by the welding at the first time, FIG. 3B shows welded regions Y1 and Y2 by the respective weldings at the first time and the second time and FIG. 3C shows welded regions Y1, Y2 and Y3 by the respective weldings at the first time, the second time and the third time.

That is, according to the above-described method of connecting the electric wire 25 and the connection terminal 21 according to the embodiment, three times of laser irradiation is carried out such that portions of the respective welded regions Y1, Y2 and Y3 by irradiating laser beam overlap each other and at the first laser beam irradiated portion, heating by irradiating laser beam constitutes rapid heating and the explosive scattering of the material of the wire caulking portion 23 which is rapidly boiled can be brought about. A portion of the welded region Y1 shown in FIG. 3A designated by notation K is a cavity constituting a defect by explosive scattering.

However, at the laser beam irradiated portion at the second time and thereafter, laser irradiation is carried out within a time period in which a state of elevating temperature by irradiating laser beam immediately previously remains and therefore, heating by irradiating laser beam at the second time and the third time does not constitute rapid heating, the material of the wire caulking portion 23 is gradually melted and therefore, as shown by FIG. 3B and FIG. 3C, explosive scattering caused by rapid boiling can be prevented from being brought about.

Further, the material which is gradually melted in irradiating laser beam at the second time flows into the cavity K formed by explosive scattering in irradiating laser beam at the first time to fill the cavity K as shown by FIG. 3B and therefore, the cavity K does not remain at the laser welded portion.

Hence, even when materials (physical properties) of the connection terminal 21 and the conductor 26 to be welded differ from each other (for example, when the connection terminal 21 is made of a Cu alloy and the conductor 26 is made of an aluminum series or Fe—Ni series metal), a stable welded state can be achieved by preventing explosive scattering from being brought about.

That is, when the conductor 26 made of the aluminum series metal and the connection terminal 21 made of the Cu alloy are welded, laser beam having high density energy matching to the aluminum series conductor 26 having the large heat of melting needs to irradiate to the connection terminal 21 made of the Cu alloy, however, as described above, according to the connecting method of the embodiment, explosive scattering of the connection terminal 21 can be restrained and stable state of welding the connection terminal 21 and the conductor 26 can be achieved.

Therefore, according to the method of connecting and the structure of connecting the electric wire 25 and the connection terminal 21 in the embodiment, even when the materials of the connection terminal 21 and the conductor 26 differ from each other, the explosive scattering phenomenon of the melted material caused by rapid boiling of the material by irradiating laser beam is restrained, and the metallic bonded portion (integrated portion by alloying) of the connection terminal 21 and the conductor 26 is formed by laser welding and therefore, the electric resistance and the mechanical strength of the welded portion can stably be ensured and an excellent connected state between the connection terminal 21 and the conductor 26 can be maintained over a long period of time.

Further, laser beam is irradiated directly from above the wire caulking portion 23 of the connection terminal 21 and therefore, the connection terminal 21 needs not to be mounted with a special structure of a projected portion or a thick-walled portion or an irradiation port or the like for laser welding.

Further, according to the embodiment, the laser beam irradiated portion is set to the bottom wall 23*a* of the wire caulking portion 23 which is difficult to deform in press contact connection of the connection terminal 21 and therefore, working accuracy of the electric wire working portion 23 to be caulked does not effect influence on laser welding and there is not needed high accuracy formation of dimension of C/W and C/H of the wire caulking portion 23 bringing about a reduction in yield of the press contact processing.

Therefore, the electric resistance and the mechanical strength of the connection terminal 21 and the electric wire 25 can stably be ensured without increasing cost of the connection terminal 21.

Further, according to the embodiment, the portions of the connection terminal 21 welded to the wire caulking portion 23 by laser are constituted by three locations, the laser welded portions can arbitrarily set so far as the laser welded portions are constituted by two portions or more. The number of the laser-welded portions may pertinently be controlled in accordance with the size of the terminal 21, the sectional area of the conductor 26, required mechanical connection strength or the like.

Further, a degree of overlapping (amount of overlapping) of the welded regions shown in FIG. 3B and FIG. 3C may pertinently be controlled such that welding of the connection terminal 21 and the conductor 26 becomes proper in consideration of a difference between melting temperatures caused by the materials of the conductor 26 and the connection terminal 21 and the like.

Further, an aluminum species material or a stainless steel species material may be used for the material of the connection terminal 21 such that the physical property becomes proximate to the physical property of the melting point or the like of the conductor 26 of the aluminum species.

Thereby, the function of connecting the connection terminal 21 and the conductor 26 is further promoted.

EXAMPLES

Next, a connection terminal according to the invention (Embodiment), which is connected with a conductor of an electric wire by crimping and subsequently performing three times of laser irradiation as described above, and a connection terminal (Comparative Example), which is connected with a conductor of an electric wire only by crimping in the same manner as Embodiment and no laser irradiation is conducted, are subjected to two durability tests. The comparison in performance of the connection terminals at the initial states and after subjected the durability tests (Durability Test 1 and Durability Test 2) respectively is illustrated in a graph of FIG. 4.

Further, a Cu alloy is used for the respective connection terminals and an aluminum series conductor is used for the respective conductors.

In this case, Durability Test 1 is a high temperature leaving test for leaving samples (10 pieces respectively) in a high temperature environment at 120° C. for 120 hours and resistances of the respective samples after having been left are measured and an average value thereof is illustrated.

Further, Durability Test 2 is a thermal shock test for leaving samples (10 pieces respectively) in an environment repeating an environment of −40° C. and an environment of 120° C. and after repeating by 200 cycles, resistances of the respective samples are measured and an average value thereof is illustrated.

Figure 4:
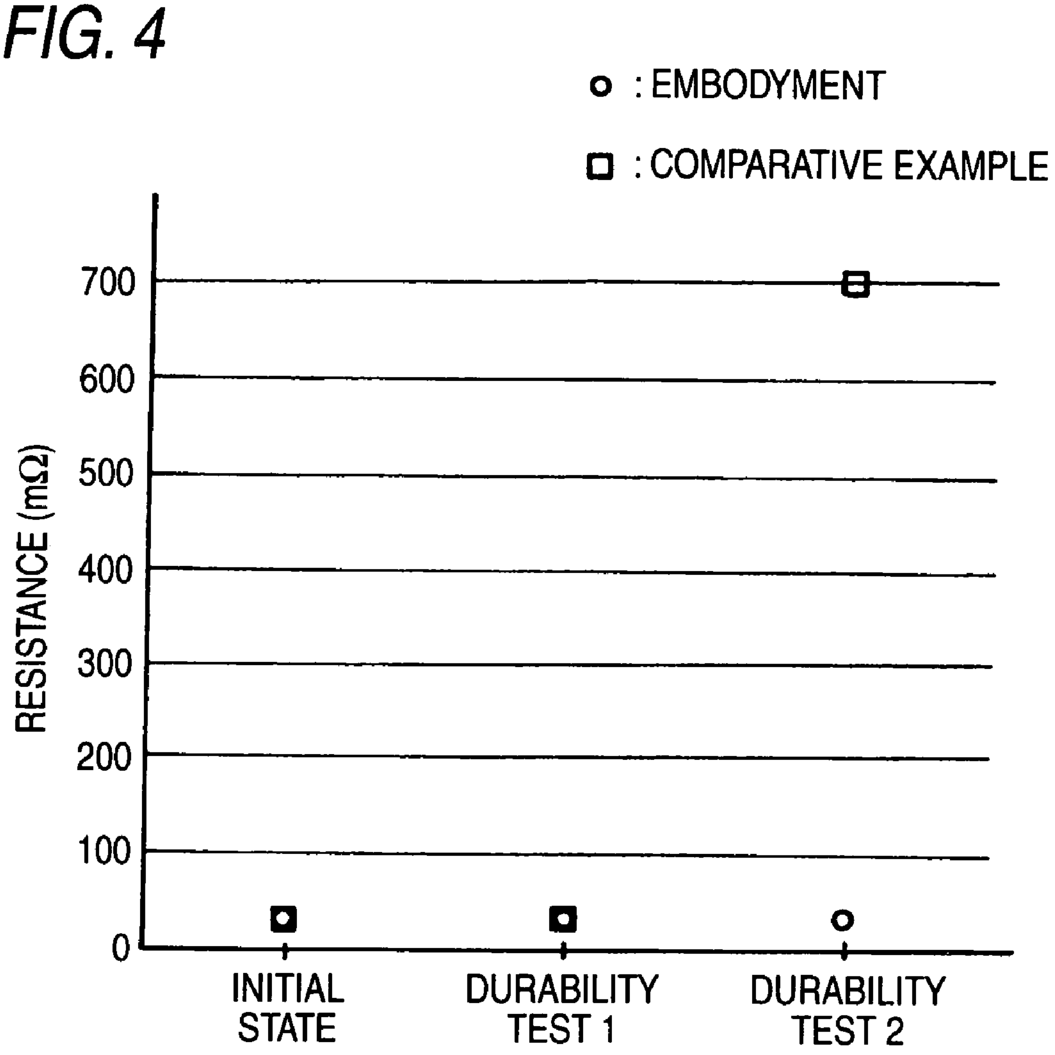
FIG. 4 is a graph showing a result of a durability test.
Figure 5:
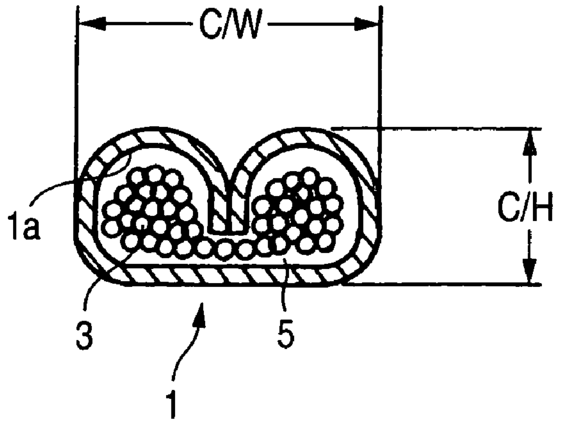
FIG. 5 is a cross-sectional view for explaining a problem of a conventional press contact terminal.
Figure 6:
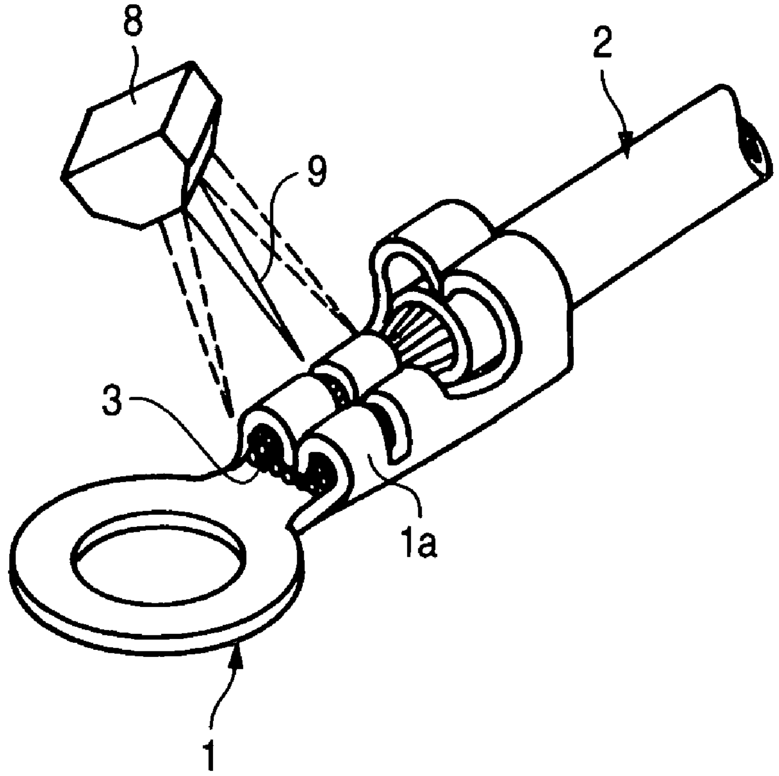
FIG. 6 is a perspective view for explaining a method of connecting an electric wire and a connection terminal by conventional laser welding.
Figure 7:
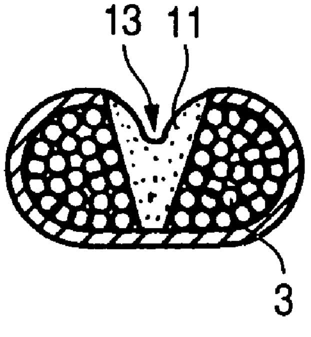
FIG. 7 is a cross-sectional view for explaining a problem of a connecting method shown in FIG. 6.
Figure 8:
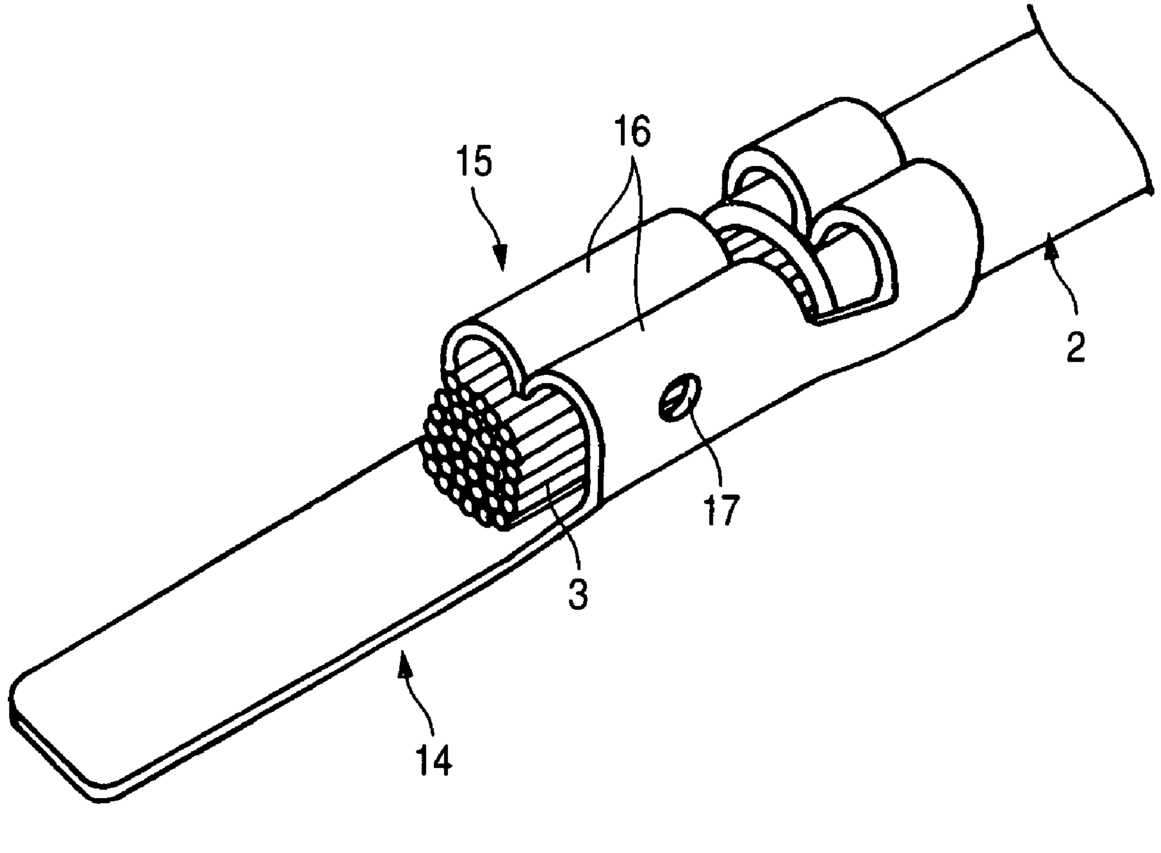
FIG. 8 is a perspective view for explaining a method of connecting an electric wire and a connection terminal by other conventional laser welding.

As is apparent from the graph of FIG. 4, although there is not a change in the high temperature leaving test (Durability Test 1) both in the embodiment and the comparative example, a large difference is observed therebetween in the thermal shock test (Durability Test 2).

This is because whereas according to the comparative example of mechanically bringing foreign metals into press contact with each other, the respective metals are elongated and contracted by a change in temperature and contact points are moved at an interface therebetween, in coupling the foreign metals welded by laser according to the embodiment, the foreign metals are alloyed to integrate and therefore, even when the foreign metals are elongated or contacted by a difference in temperatures, a total of the alloy is elongated and contracted which has nothing to do with the coupling. Therefore, there is not a change in the resistance of the connection terminal according to the embodiment.

According to the method of connecting and the structure of connecting the electric wire and the connection terminal of the invention, a connection terminal and an electric wire are welded to connect by irradiating laser beam from above the wire caulking portion of the connection terminal, the metallic bonding portion is formed between the connection terminal and the electric wire and therefore, the electric resistance and the mechanical strength can stably be ensured.

Further, although at the first laser beam irradiated portion, rapid boiling is brought about by rapid heating by irradiating laser beam and explosive scattering can be brought about at the wire caulking portion, however, the laser beam irradiated portions at the second time and thereafter are set such that the welded regions overlap both of the laser beam irradiated portions immediately previously, laser beam is irradiated within the time period in which the state of elevating temperature by irradiating laser beam immediately previously remains and therefore, heating by irradiating laser beam at the second time and thereafter does not constitute rapid heating but the materials are melted gradually and therefore, explosive scattering caused by rapid boiling can be prevented from being brought about.

Further, even when the recess or the cavity is formed by explosive scattering in irradiating laser beam at the first time, the melted material flows into the recess portion or the cavity to fill in irradiating laser beam at the second time and therefore, the recess or the cavity does not remain at the laser welded portion.

Hence, even when the materials of the connection terminal and the electric wire differ from each other and laser beam having high density energy matched to a material having large heat of melting needs to irradiate, a stable welded state can be achieved by preventing explosive scattering from being brought about and an excellent connected state between the connection terminal and the electric wire conductor can be maintained over a long period of time.

Therefore, there can be provided the excellent method of connecting and the excellent structure of connecting the electric wire and the connection terminal capable of stably ensuring the electric resistance and the mechanical strength of the connection terminal and the electric wire without increasing cost of the connection terminal.

What is claimed is:

1. A method of connecting an electric wire and a connection terminal comprising the steps of:

crimping an aluminum conductor of the electric wire with a wire caulking portion of the connection terminal made of a copper alloy;

subsequently performing at least a first laser irradiation, a second laser irradiation and a third irradiation to a bottom wall of the wire caulking portion for laser welding;

wherein the second laser irradiation is carried out subsequently to the first laser irradiation within a predetermined time period in which a laser welded portion welded in the first laser irradiation is brought into a predetermined state of elevating a temperature, and a second welded region, on which the second laser irradiation is carried out, is formed so as to form a first overlapped region between the second welded region and a first welded region on which the first laser irradiation is carried out, and a third laser irradiation is carried out subsequently to the second laser irradiation within a predetermined time period in which a laser welded portion welded in the second laser irradiation is brought into a predetermined state of elevating a temperature, and a third welded region, on which the third laser irradiation is carried out, is formed so as to form a second overlapped region between the third welded region and the second welded region on which the second laser irradiation is carried out, wherein said first overlapped region and said second overlapped region are arranged along the longitudinal direction of the bottom wall of the connection terminal.

2. A method of connecting an electric wire and connection terminal according to claim 1, wherein laser irradiation occurs only at the bottom wall of the connection terminal.

* * * * *

UNITED STATES PATENT AND TRADEMARK OFFICE

CERTIFICATE OF CORRECTION

PATENT NO. : 7,705,265 B2 
APPLICATION NO. : 11/265360
DATED : April 27, 2010
INVENTOR(S) : Nobuyuki Asakura, Kei Fujimoto and Masanori Onuma It is certified that error appears in the above-identified patent and that said Letters Patent is hereby corrected as shown below:

Insert on Title Page

--(30) Foreign Application Priority Data
Dec. 11, 2002 (JP) ............................... 2002-359486--

Signed and Sealed this

Twenty-eighth Day of September, 2010

David J. Kappos
*Director of the United States Patent and Trademark Office*